United States Patent [19]

Weller et al.

[11] Patent Number: 4,798,410
[45] Date of Patent: Jan. 17, 1989

[54] LIFTING SLIDING ROOF FOR VEHICLES

[75] Inventors: Klaus Weller, Bopfingen; Walter Braun, Sindelfingen; Harry Nennemann, Leinfelden-Echterdingen, all of Fed. Rep. of Germany

[73] Assignee: Dr. Ing. h.c.F. Porsche Aktiengesellschaft, Stuttgart, Fed. Rep. of Germany

[21] Appl. No.: 108,647

[22] Filed: Oct. 15, 1987

[30] Foreign Application Priority Data

Oct. 23, 1986 [DE] Fed. Rep. of Germany ....... 3636029

[51] Int. Cl.⁴ ............................ B60J 7/047; B60J 7/22
[52] U.S. Cl. ......................... 296/217; 296/216; 296/220; 98/2.12; 98/2.14; 49/71
[58] Field of Search ............... 296/216, 217, 220, 221; 98/99.3, 99.4, 2.12, 2.14; 160/95, 96, 102, 107; 49/71

[56] References Cited

U.S. PATENT DOCUMENTS

| | | | |
|---|---|---|---|
| 2,311,413 | 2/1943 | Persson | 160/80 X |
| 4,089,557 | 5/1978 | Leiter | 296/221 |
| 4,522,115 | 6/1985 | Kelly et al. | 296/216 X |
| 4,602,815 | 7/1986 | Boots et al. | 296/216 X |
| 4,647,106 | 3/1987 | Furst | 296/223 |
| 4,702,518 | 10/1987 | Paerisch et al. | 296/221 X |
| 4,709,959 | 12/1987 | Paerisch et al. | 296/221 X |

FOREIGN PATENT DOCUMENTS

| | | | |
|---|---|---|---|
| 3103062 | 8/1982 | Fed. Rep. of Germany | 296/216 |
| 3311498 | 10/1983 | Fed. Rep. of Germany | |
| 366466 | 12/1938 | Italy | 296/216 |

*Primary Examiner*—Dennis H. Pedder
*Attorney, Agent, or Firm*—Barnes & Thornburg

[57] ABSTRACT

A lifting sliding roof for a vehicle having a cover that is inserted into a cover opening and that, starting from a closed position, while lifting its rear edge, is tiltable into a tilted position and in this position is moved over the fixed part of the roof toward the rear into an open position. When the cover is lifted but rests against a front edge of the roof opening, air can flow via lateral gap areas and a rear gap area between the cover and the roof into the passenger compartment, but when the cover is tilted and is pushed to the rear at least partially, a sealing frame is provided that closes off the lateral gap areas and the rear gap area so that in this cover position, the air reaches the passenger compartment only through the area of the roof opening that is located in front of the cover.

18 Claims, 9 Drawing Sheets

LIFTING SLIDING ROOF FOR VEHICLES

BACKGROUND AND SUMMARY OF THE INVENTION

The present invention relates to a lifting sliding for vehicles having a cover that is used for the selective closing and at least partial exposing of a roof opening, this cover carrying guiding elements on both sides in the front area that are guided so that they can be adjusted along guide rails that are connected with a fixed part of the roof and are arranged laterally of the roof opening. The cover, starting from a closed position while lifting its rear edge, is able to be brought into a tilted position and is movable over the fixed part of the roof into an open position.

A lifting sliding roof of the above-mentioned type is shown in German Published Unexamined Patent Application No. 3,311,498. In this device, when the cover is lifted and is partially pushed to the rear, the air flows through the cutout in the roof located in front of the cover and also via the lateral and rear gap area between the cover and the roof into the passenger compartment.

This arrangement has the disadvantage that at the front inlet area (roof opening) a higher vacuum exists than at the rear inlet opening (the lateral and rear gap areas), whereby the air flowing in at the rear is moved toward the front over the head area of a passenger of the vehicle to the front inlet opening. This air flow results in disturbing draft phenomena in the head area of the passenger of the vehicle.

It is an objective of the present invention to take such measures at a lifting sliding roof so that the above-mentioned disadvantages are avoided.

This and other objectives are achieved by the present invention by providing a lifting sliding roof for vehicles having a cover for selectively closing and at least partially exposing a roof opening with a rear edge of the cover being tiltable to create lateral air gaps and a rear gap. The cover is slidable away from a position adjacent a front edge of the roof opening to create a front air gap so that air flows into the vehicle through the lateral and rear air gaps when the cover is tilted and adjacent to the front edge of the roof opening. A sealing frame prevents air flow through the lateral and rear air gaps into the vehicle and causes air to flow through the front air gap into the vehicle when the cover is tilted and slid away from the front edge of the roof opening.

The main advantages that are achieved by the invention are that, by means of the arrangement of a sealing frame that closes off the lateral and rear gap area between the cover and the roof when the cover is pushed at least partially to the rear, always only a single inlet opening exists for the air flowing into the passenger compartment. As a result, bothersome draft phenomena in the passenger compartment are avoided.

The sealing frame has a simple construction, comprises a few components and can be mounted rapidly. When the cover is pushed back, the spring elements are able to press the sealing frame into its moved-out operating position.

Other objects, advantages and novel features of the present invention will become apparent from the following detailed description of the invention when considered in conjunction with the accompanying drawings.

BRIEF DESCRIPTION OF THE DRAWINGS

FIG. 3 is a view corresponding to FIG. 1 with a lifted cover that is pushed partially toward the rear and a sealing frame constructed according to a preferred embodiment of the present invention.

DETAILED DESCRIPTION OF THE DRAWINGS

Figure 8:
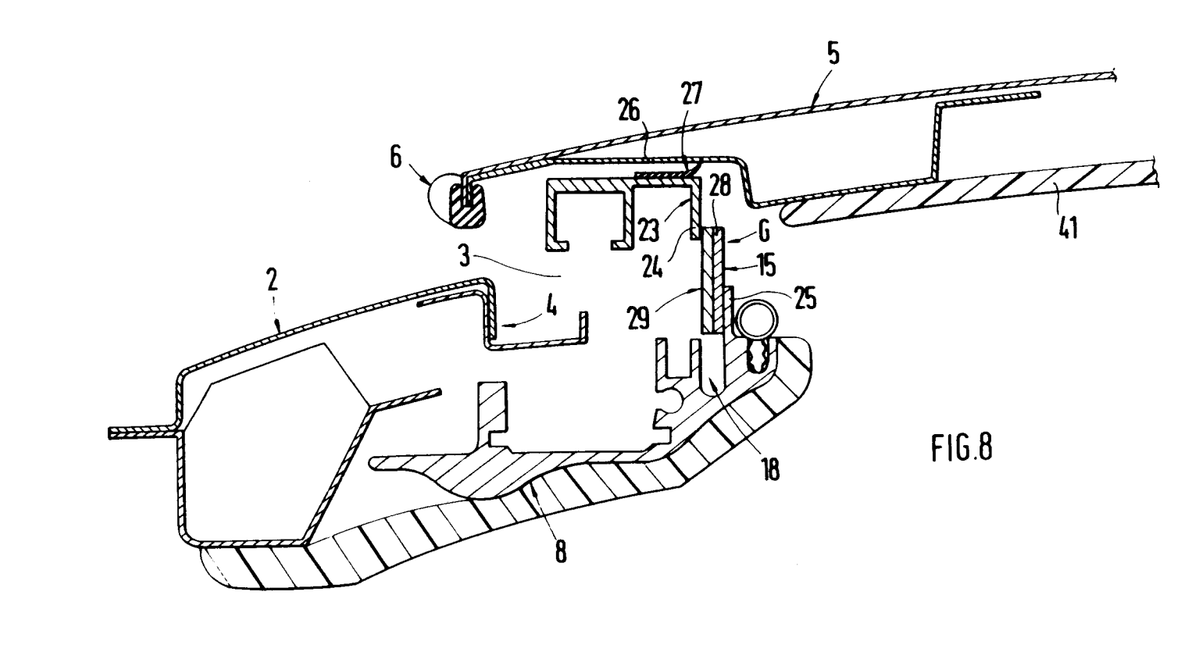
FIG. 8 is an enlarged sectional view according to the Line VIII—VIII of FIG. 7; rotated by 90°.

The passenger car 1 that is shown in FIGS. 1 to 6, in the front area of a roof 2, has a roof opening 3 that is surrounded by a roof frame 4 (FIG. 8) with an approximately U-shaped profile. For the selective closing or exposing of the roof opening 3, a rigid cover 5 is provided that is constructed in certain preferred embodiments, for example, of glass, plastic, sheet metal or the like.

Figure 9:
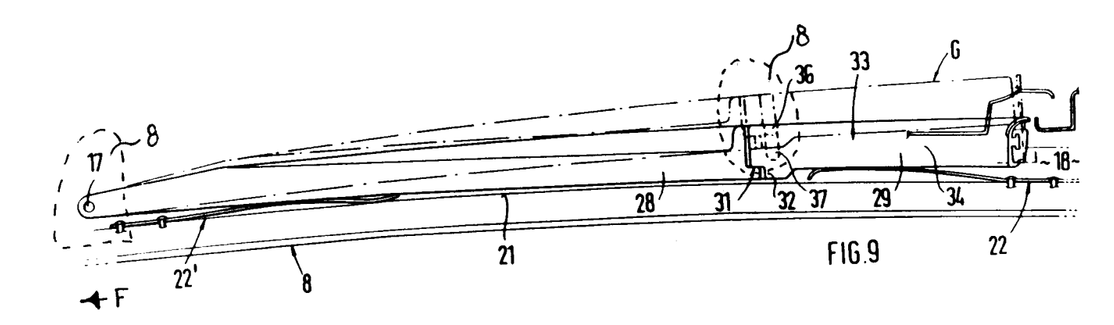
FIG. 9 is a view in the direction of the Arrow R of FIG. 7.
Figure 10:
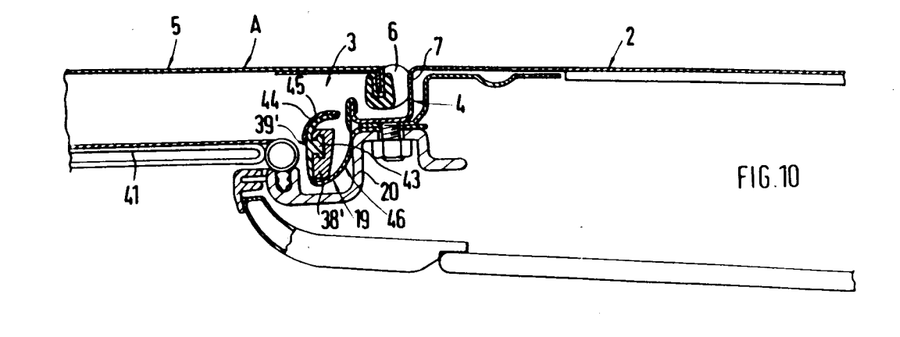
FIG. 10 is an enlarged sectional view according to the Line X—X of FIG. 7.

In a closed position A, a sealing device 6 that is arranged at the edge of the cover 5, while being prestressed, rests against an upright wall portion 7 of the roof frame 4 (FIG. 10). In the front area of its two exterior longitudinal sides, the cover 5 has guiding elements that are not shown in detail and that are guided so that they can be adjusted along lateral guide rails 8 (FIG. 9) that are fixed on the side of the body. The cover 5, starting from its closed position A, while lifting its rear edge 9, can be brought into a tilted position B (FIG. 1) and over the fixed part of the roof 2 can be moved toward the rear into an open position C (lifting sliding roof, seen in FIG. 5).

Figure 1:
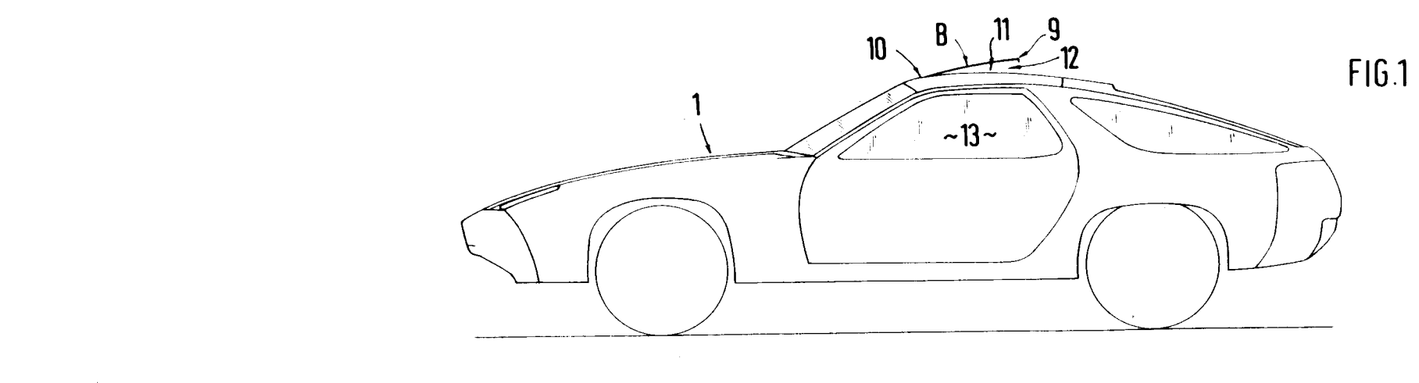
FIG. 1 is a lateral view of a vehicle having a lifting sliding roof, with a cover shown tilted out with its rear edge in upward direction.
Figure 2:
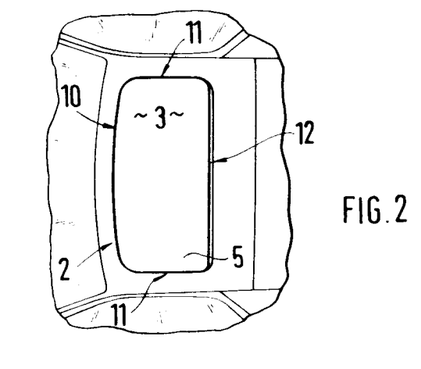
FIG. 2 is a partial top view of FIG. 1.

According to FIGS. 1 and 2, the cover 5 rests against a front edge 10 of the roof opening 3, whereas the rear edge 9 of the cover 5 is lifted by a lifting device that is not shown in detail. In this tilted position B of the cover, the air flows via lateral gap areas 11 and a rear gap area 12, into a passenger compartment 13 of the passenger car 1.

If, on the other hand, the lifted cover 5 is in addition by an amount S1 pushed toward the rear into an intermediate position D (FIGS. 3 and 4), the lateral gap areas 11 and the rear gap area 12 can be closed off by a sealing frame 14 in such a way that in the intermediate position D of the cover 5, the air reaches the passenger compartment 13 only through the opening E located in front of the cover 5.

Figure 5:
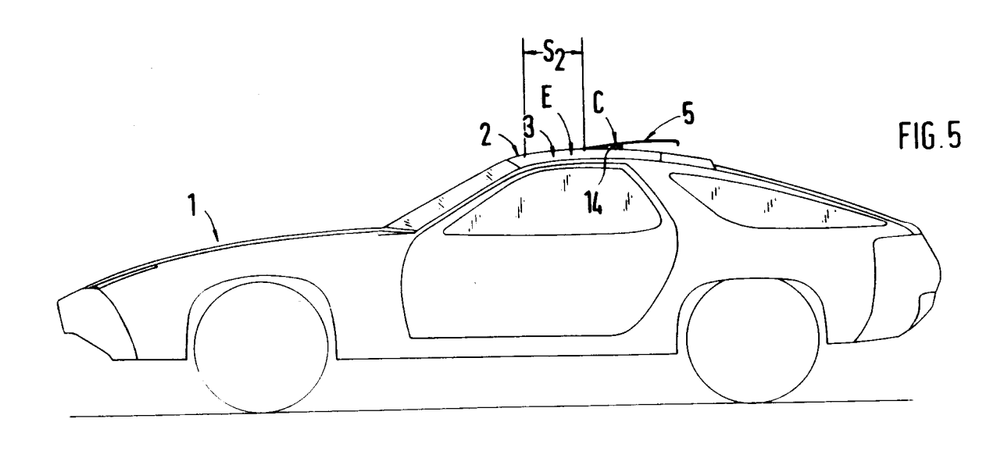
FIG. 5 is a view corresponding to FIG. 1 with a lifted cover that is pushed completely toward the rear and the sealing frame of FIG. 3.
Figure 6:
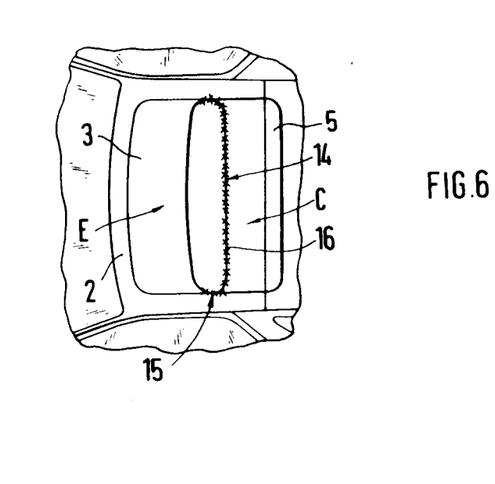
FIG. 6 is a partial top view of FIG. 5.

When the cover 5 is completely moved back (open position C), the rear gap area 12 and the two lateral gap areas 11 between the cover 5 and the roof 2 are also closed off by the sealing frame 14 (FIGS. 5 and 6). In the open position C, the cover is pushed toward the rear by an amount S2. In cover position C, the opening E has a much larger area than in cover position D.

Figure 4:
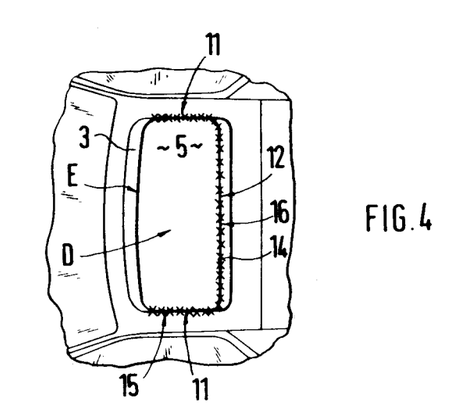
FIG. 4 is a partial top view of FIG. 3.
Figure 7:
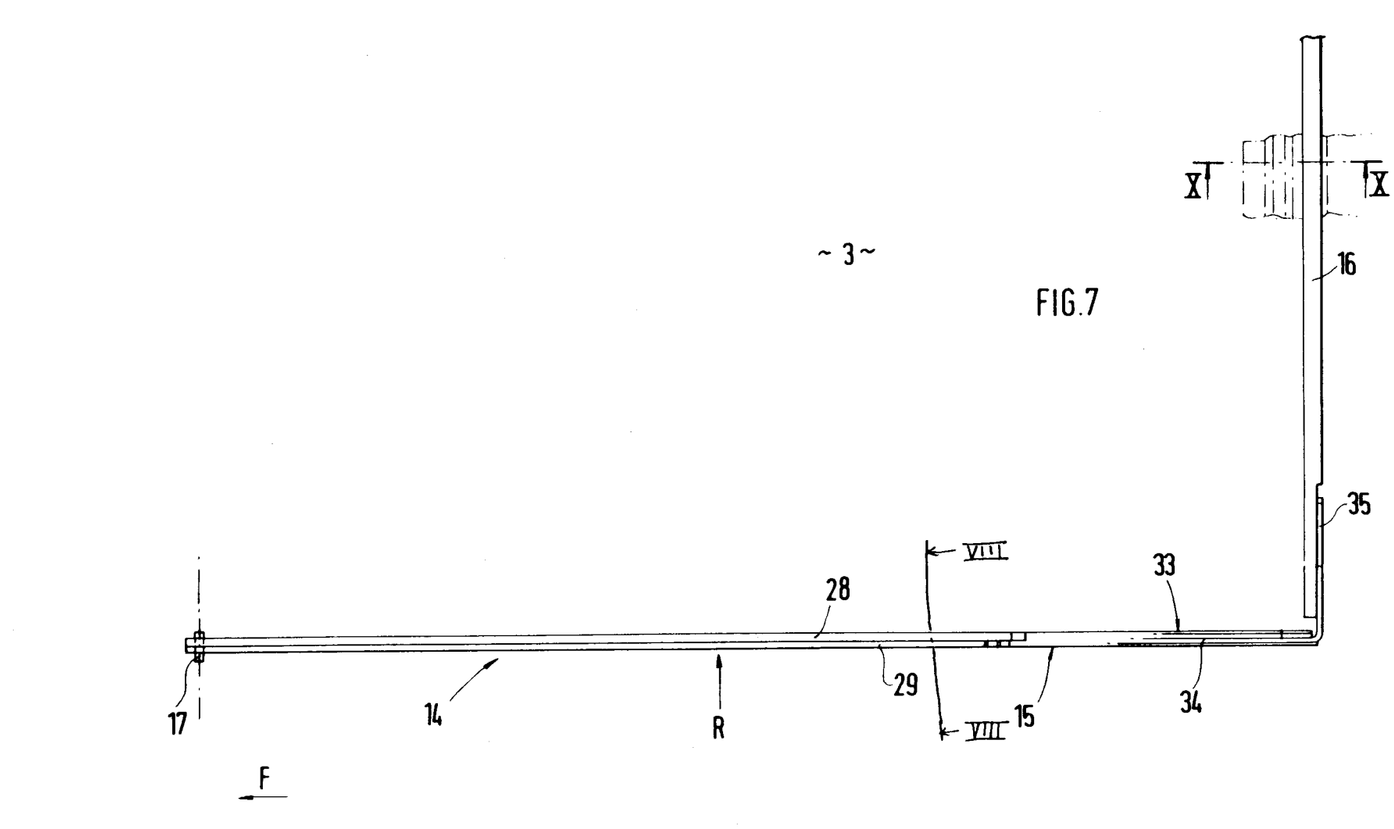
FIG. 7 is an enlarged partial top view of the sealing frame of FIG. 3.

As seen in FIGS. 4 and 6, the sealing frame 14 that is arranged on the side of the body comprises two lateral arms 15 extending in longitudinal direction of the vehicle. These arms 15 are pivoted at their ends that are in front seen in driving direction F, and at their ends that are located at the rear, are firmly connected with one another by means of a transverse web 16. According to FIG. 7, the two arms 15, while being rotatable via transversely extending shafts 17, are connected with the fixed guiding rails 8 on the side of the body.

In the closed position A of the cover, the two arms 15 and the transverse web 16 extend in a hidden way in groove-type receiving portions 18, 19 of the two guide rails 8 as well as a transversely extending guide rail 20 (FIGS. 9 and 10). At the bottom 21 of the receiving portion 18, at least one spring element 22' or 22 is provided that moves the lateral arm 15 of the sealing frame 14 upward when the cover 5 is moved against the driving direction F (FIG. 9). In a moved-out operating position G, the lateral arm 15 of the sealing frame 14 extends between the guide rail 8 on the side of the body and a guide rail 23 (FIG. 8) on the side of the cover 5 and reaches over respective adjacent portions 24, 25 of the two guide rails 23, 8. In addition—seen in transverse direction of the vehicle—the arms 15, on one side, rest against the guide rail 23 on the side of the cover 5 and, on the other side, against an upright portion of the guide rail 8 on the side of the body. Each arm 15 is preferably constructed of sheet metal and is provided with a flock coating. In addition, a sealing body 27 is provided between the top side of the guide rail 23 and an interior metal sheet 26 of the cover 5.

Figure 14:
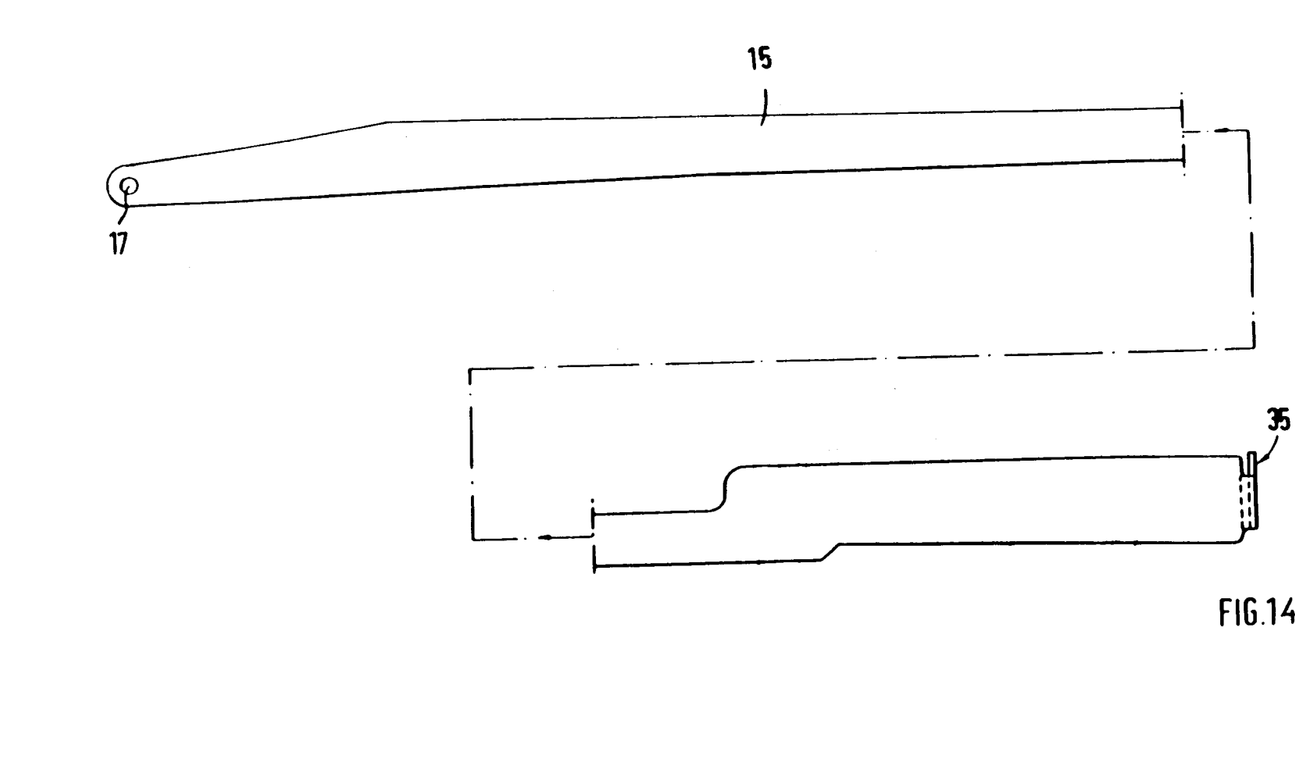
FIG. 14 is a lateral view of the single shutter arm of the sealing frame.

The arm 15 is either one piece or several pieces in preferred embodiments. According to FIGS. 7 to 9, each arm 15 comprises two shutters 28, 29 that are arranged next to one another and that can be pivoted around a joint shaft 17. The shorter shutter 28 can be moved upward only as a function of the longer shutter 29. In the moved-out operating position G, however, the shorter shutter 28 can be moved downward independently of the longer shutter 29. By this design, it is ensured that in all positions of the cover 5, an optimal sealing of the lateral gap 11 takes place. FIG. 14 shows the arm 15 as a single piece.

Figure 13:
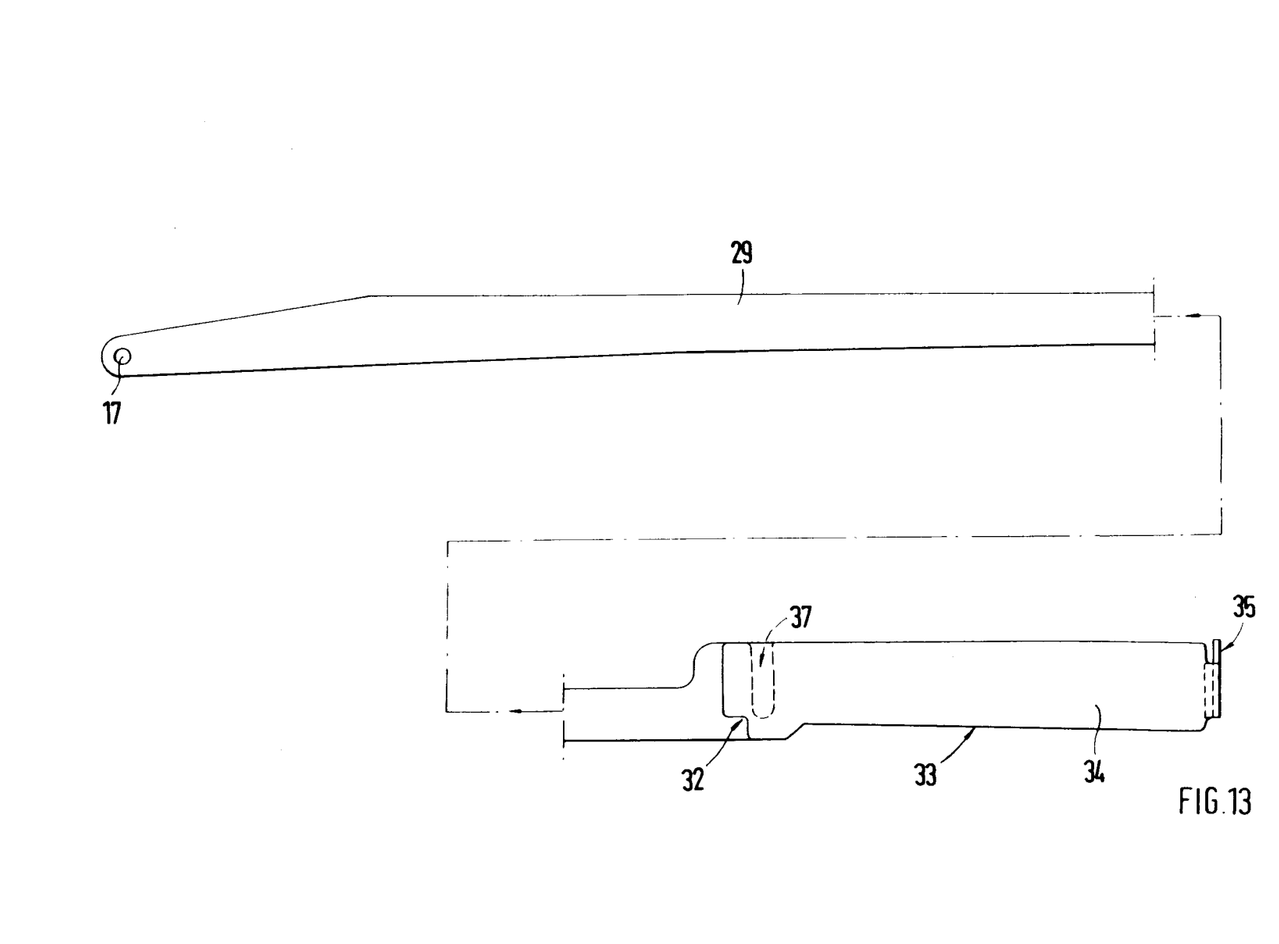
FIG. 13 is a lateral view of a longer shutter of the arm of the sealing frame.

The longer shutter 29 (seen in FIG. 13), in the area of the longitudinal course of the shorter shutter 28, has a lower height than the shutter 28. At its free end 30, the shorter shutter 28 (seen in FIG. 12), is provided with a step-shaped shoulder 31 that reaches below a correspondingly designed recess 32 of the shutter 29. At the shutter 29, in an area 33 at the exterior side, a reinforcement 34 is placed, and apron 35 that is directed toward the interior is connected with the transverse web 16.

The pivoting movement of the two arms 15 is limited by a stop pin 36 that is arranged on the guide rail 8 that is fixed at the side of the body. The stop pin 36 interacts with a guiding slot 37 of the lateral arm 15 that is open in upward direction.

If the arms 15 are developed in two parts, a separate spring element 22 or 22' is provided for the shutter 28 as well as for the shutter 29. According to FIG. 9, each spring element 22 or 22' is formed by a leaf spring that is fixed by riveting at the bottom 21 of the groove-type receiving portion 18. The leaf spring that is assigned to the shutter 28 is provided adjacent to the transversely extending shaft 17, whereas the other leaf spring is fixed adjacent to a rear end of the roof opening 3 at the guide rail 8. In a contemplated embodiment, the spring element 22 is a pressure spring.

Figures 11, 12:
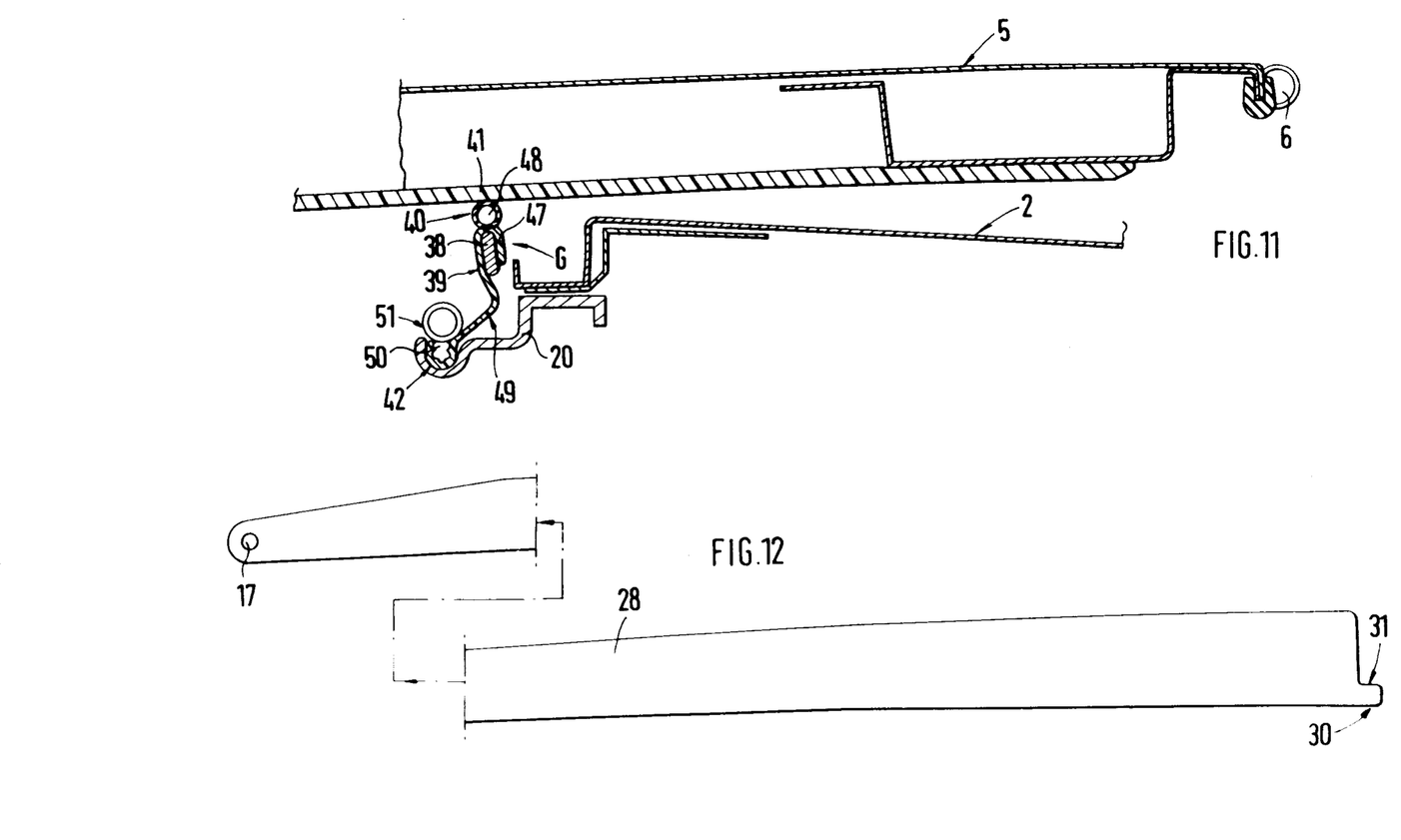
FIG. 11 is a sectional view corresponding to FIG. 10 of another preferred embodiment.
FIG. 12 is a lateral view of a shorter shutter of an arm of the sealing frame.

The transverse web 16 of the sealing frame 14, according to FIG. 11, comprises an upright support part 38, at which an element 39 is fastened that is made of an elastic material and that, when the sealing frame 14 is moved out, with its one end 40, while being prestressed, rests against an interior lining 41 of the cover. The other end 42 of the sealing element 39 is connected with the transversely extending guide rail 20 that is also fixed on the side of the body.

As shown in FIG. 10, the support part 38 has a dovetailed recess 43 into which a foot portion of the sealing element 39' is inserted. The portion of the sealing element 39' that interacts with the interior lining 41 of the cover, according to FIG. 10, is a lip 44 that, on the side facing the cover 5, is provided with a flock coating 45.

A tab-type elastic portion 46 of the sealing element 39 is guided around the lower edge of the support part 38 and is clamped in between the roof frame 4 and the guide rail 20. In FIG. 10, the transverse web 16 is located in its moved-in rest position.

According to FIG. 11, the sealing element 39, with a receiving portion 47 that is profiled in a U-shape, is placed from above on the support part 38. A hose profile 48 that is arranged above the receiving portion 47 interacts with the interior lining 41 of the cover, whereas a foldable lower portion 49, at the end side, is held in position in a groove 50 of the transversely extending guide frame 20. For this purpose, a profile 51 is inserted in the groove 50. FIG. 11 shows the transverse web 16 of the sealing frame 14 in its moved-out position G, so that the cover 5 is pushed toward the rear over the fixed part of the roof 2.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A lifting sliding roof for vehicles comprising:
   a vehicle roof;
   a cover means for selectively closing and at least partially exposing a roof opening in said vehicle roof;
   a rear edge means of said cover means being tiltable vertically from said roof opening to create lateral side air gaps and a rear air gap between said cover means and said roof opening; said cover means being slidable from a tilted position adjacent a front edge of said roof opening toward the rear of the vehicle to create a front air gap between said cover means and said front edge of said roof opening to allow air flow into said vehicle;
   sealing frame means movable into abutment with said cover means for preventing air flow through said lateral side and rear air gaps into said vehicle while allowing air to flow through said front air gap into said vehicle when said cover means is both vertically tilted and slid away from said front edge of said roof opening; and said sealing frame means being retractable out of abutment with said cover means to allow air flow through said lateral side and rear gaps when said cover means is only vertically tilted.

2. A lifting sliding roof according to claim 1, wherein said sealing frame means are arranged on said vehicle roof.

3. A lifting sliding roof according to claim 2, further comprising guide rails that are fixed on said vehicle roof and transversely extending shaft means for pivoting said sealing frame means on said guide rails.

4. A lifting sliding roof according to claim wherein said sealing frame means includes two lateral arm means extending in a longitudinal direction of said vehicle and which are pivoted to the guide rails at their front ends that are located toward the front of the vehicle, and with their rear ends, located toward the rear of the vehicle, being firmly connected with one another via a transverse web.

5. A lifting sliding roof according to claim 4, wherein each of said two lateral arm means extends between one of said vehicle roof guide rails and guide rails on said cover means, and are tiltable with respect to said vehicle roof guide rail.

6. A lifting sliding roof according to claim 4, wherein each of said two lateral arm means is composed of one piece.

7. A lifting sliding roof according to claim 4, wherein each of said two lateral arm means comprises several parts.

8. A lifting sliding roof according to claim 7, wherein each of said two lateral arm means comprises two upright shutter means arranged next to one another for pivoting around said extending shaft means.

9. A lifting sliding roof according to claim 8, wherein one of said shutter means is shorter than the other shutter means, said longer shutter means extending rearwardly of the shorter shutter means and said shorter shutter means being allowed to move vertically upward by said longer shutter means, and wherein in a tilted out position of both of said shutter means, said shorter shutter means is moveable vertically downward independently of said longer shutter means.

10. A lifting sliding roof according to claim 9, wherein said shorter shutter means has a free end with a step-shaped shoulder, and said longer shutter means has a corresponding recess which supports said shorter shutter means step-shaped shoulder.

11. A lifting sliding roof according to claim 4, further comprising at least one spring means for moving each said lateral arm into its operating position.

12. A lifting sliding roof according to claim 11, wherein said spring means is at least one leaf spring fastened at a bottom of said body guide rail, said leaf spring interacting with a bottom side of an assigned said lateral arm.

13. A lifting sliding roof according to claim 4, further comprising stop pin means on said vehicle body guide rail, said stop pin means interacting with a guiding slot of said lateral arm means for limiting a tilting movement of said lateral arm.

14. A lifting sliding roof according to Claim 4, wherein said cover includes an interior lining and said transverse web is a support part at which an elastic sealing element is fastened, said sealing element, in the moved-out operating position of the sealing frame interacting in a sealing manner with said interior lining and with a stationary structural part on said vehicle body.

15. A lifting sliding roof according to Claim 14, wherein said sealing element has at least one of a lip-shaped portion and a hose-shaped portion for supporting itself at said interior lining when said cover is slid back.

16. A lifting sliding roof according to claim 14, wherein said sealing element is held in position adjacent said support part by a dovetailed connection.

17. A lifting sliding roof according to claim 14, wherein said sealing element has a receiving portion that is profiled in a U-shape which is placed on said support part from above, and a lower tab portion which is at least one of deformable and foldable that is fixed at said vehicle body guide rail which extends transversely.

18. A lifting sliding roof according to claim 1, wherein said sealing frame means can be moved into abutment with said cover means at a tilted and rearwardly slid position of said cover means.

* * * * *